Sept. 23, 1958 R. L. BASSETT 2,853,351

DESK WITH APRON

Filed June 15, 1955 2 Sheets-Sheet 1

INVENTOR.
RUSSELL L. BASSETT
BY
Peter P. Price
ATTORNEY

Sept. 23, 1958 R. L. BASSETT 2,853,351

DESK WITH APRON

Filed June 15, 1955 2 Sheets-Sheet 2

INVENTOR.
RUSSELL L. BASSETT
BY Peter P. Price
ATTORNEY

United States Patent Office 2,853,351
Patented Sept. 23, 1958

2,853,351

DESK WITH APRON

Russell L. Bassett, Whittier, Calif., assignor to Steelcase, Inc., Grand Rapids, Mich., a corporation of Michigan Application June 15, 1955, Serial No. 515,630

7 Claims. (Cl. 312—194)

This invention relates to office furniture and more particularly to an office desk which is provided with a specific type apron having means for removably mounting equipment, particularly communications equipment such as a telephone box.

It is common practice to mount telephone boxes and other electrical equipment on the side or back of a desk. The mounting of such equipment on desks is usually necessary because of the lack of space for mounting such equipment in any other location. This is especially true in a large office room where there are several desks spaced throughout the room.

The installation of such equipment on office desks, especially telephone boxes, has heretofore created quite a problem and is usually a nuisance. Many desks are made of metal which necessitates drilling holes into the desk in order to install the telephone box. Very often this marks the desk and ruins its appearance. The greatest disadvantage in the present day method of installing telephone boxes on desks is the time and trouble in removing the boxes when a desk is relocated or replaced. This necessitates removing the box and installing it on the new desk or disconnecting the wires to the box.

This invention is designed to provide a simple, convenient apparatus for installing electrical equipment on desks.

This invention also provides a simple, inexpensive and convenient apparatus for removably installing telephone boxes and similar equipment on desks.

This invention provides apparatus for a desk that permits permanent attachment of equipment to its support with or without the present of the desk.

In accordance with this invention communications equipment is assembled independent of the office furniture on which it is to be supported and thereafter installation is made on such furniture either before or after the furniture is moved into the office.

This invention provides a pivoted apron for a desk, such apron providing accessibility for installation of electrical equipment whereby the installation time and cost for such equipment is reduced.

Further, this invention facilitates concealment of equipment on a desk while at the same time providing easy accessibility to such equipment.

These and other objects and purposes of this invention will become apparent upon reading the following specification in conjunction with the accompanying drawings wherein.

Figure 1:
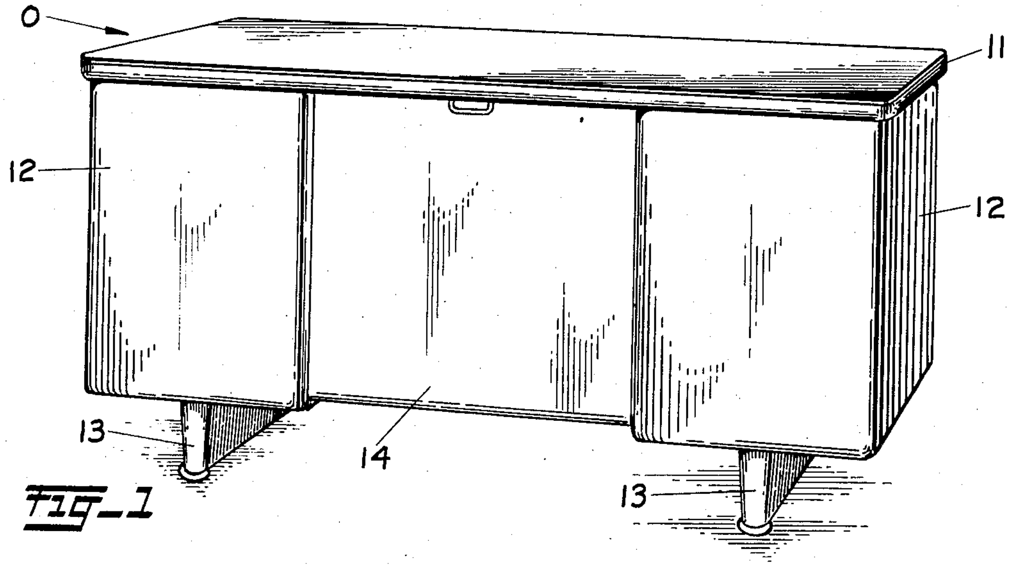
Fig. 1 is an oblique view of a desk with the apron in closed position.

Referring specifically to the drawings, Fig. 1 shows the front of a desk 10 which has a top 11, and in this case, drawer wells 12 in which drawers (not shown) are usually mounted. Top 11 and drawer wells 12 are supported by legs 13. The structure of top, drawer wells, and legs are all conventional and well known in the art.

The drawer wells 12 are spaced, forming a wide passage between them and beneath the top 11. At the front of this desk, the passage is closed by an apron 14. This apron is pivotally secured about its lower end between the drawer wells 12.

Preferably, the desk of this invention as illustrated is made of metal construction. It should be understood, however, that this invention can be applied to desks made of material other than metal. The arrangement of the apron of this invention as it is pivoted on a desk is illustrated in Fig. 2.

Figure 2:
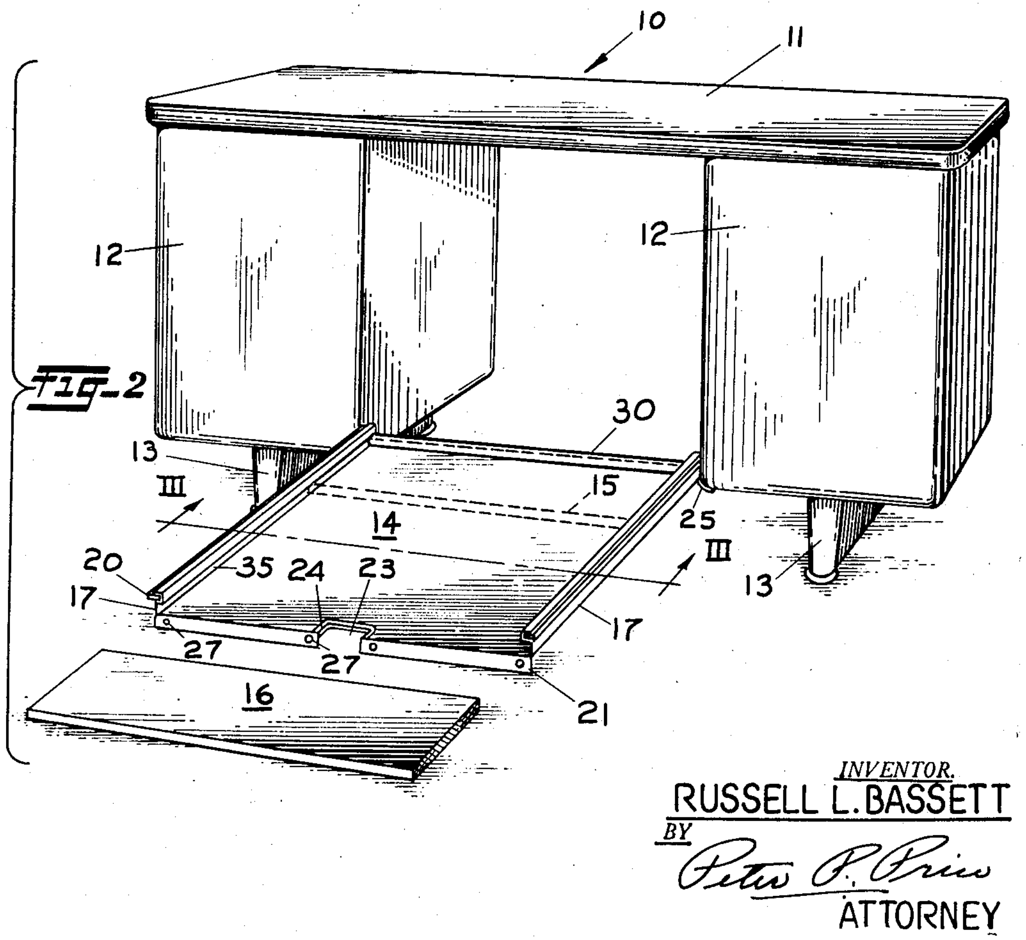
Fig. 2 is an oblique view of a desk with the apron open.

Fig. 2 shows desk 10 with apron 14 swung downwardly. Reference numeral 16 indicates a panel board on which electrical equipment is to be mounted. In the open position of apron 14 panel board 16 can be easily inserted on the inside face of the apron by means of sliding the same in the channels formed by edges 17. From Fig. 2 it should be apparent that the apron 14 is pivoted at its lower corners on brackets 25 located on corresponding corners of drawer wells 12. Panel board 16 is preferably made of wood but any type of material can be employed to which electrical equipment can be secured. Therefore, plastic or metal can be used.

Figure 3:
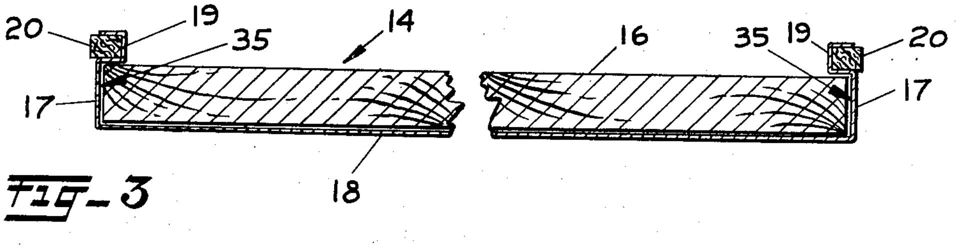
Fig. 3 shows an enlarged sectional elevation view taken along the plane III—III of Fig. 2.

Apron 14, in this case, is constructed of sheet metal stock and its size and shape corresponds to the size and shape of the space between drawer wells 12. Preferably, apron 14, including the means for supporting panel board 16 is formed in one piece. This is best shown in Fig. 3. Fig. 3 discloses that apron 14 is formed of a single piece of sheet metal stock having its side edges 17 turned back at right angles to main panel 18. Edges 17 are formed into an S-shaped channel having recesses 35 and 19. The recess 35 forms a track in which board 16 slides and is supported. Recess 19 seats the gasket 20. Gasket 20 provides a seal between the apron 14 and drawer wells 12 when the apron is in the upright closed position. The means for supporting panel board 16 can constitute many different structures. Accordingly, the shape of panel board 16 will be varied correspondingly.

Apron 14, as shown in Fig. 2, also has at its top edge a flange 21 turned forwardly at right angles to panel 18 and having screw holes 27 for fastening apron 14 to the underside of desk top 11 in the upright position. Also at the top of apron 14 there is provided a cut-out portion 23 through which wires from the telephone box can extend to a telephone located on the top of the desk. Cut-out portion 23 has, on its edges, a gasket 24 made of rubber or other soft material which will prevent sharp edges from cutting the telephone lines.

Figure 4:
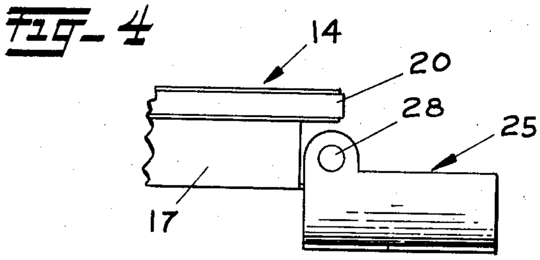
Figs. 4 and 5 are enlarged, fragmentary view of the hinge structure for the pivoted apron.
Figure 5:
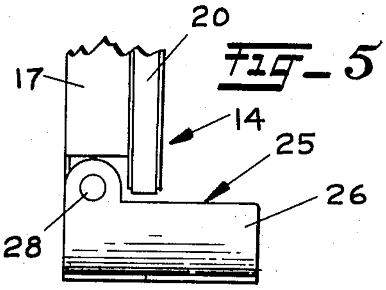
Figures 6, 7:
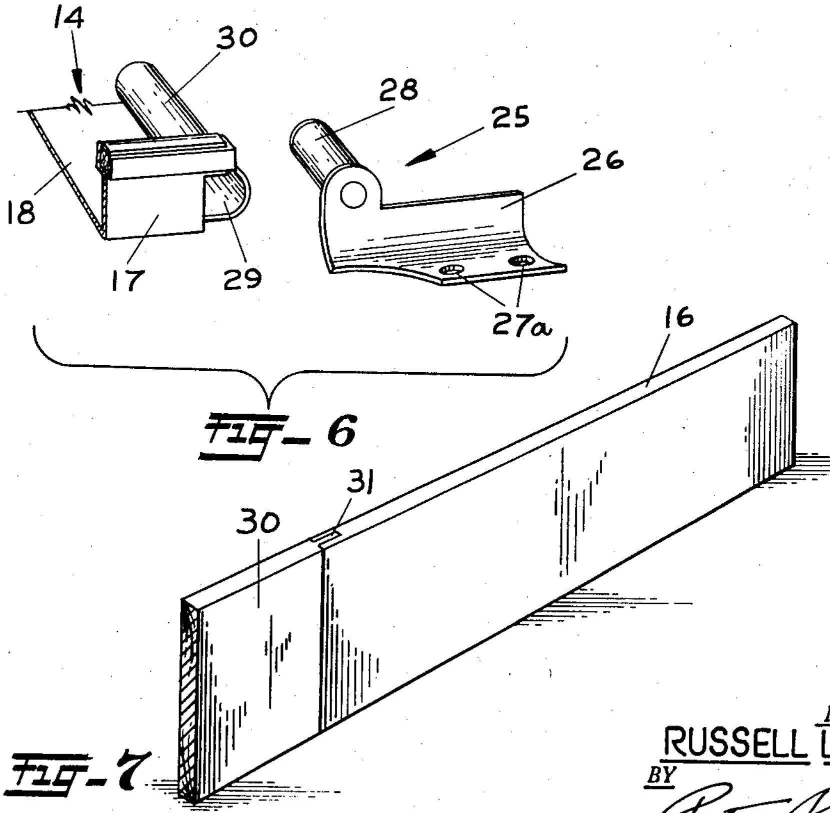
Fig. 6 is a fragmentary, oblique exploded view of the apron hinge.
Fig. 7 is an enlarged, oblique view of a modification of this invention.

Figs. 4, 5 and 6 show a hinge structure suitable for pivotally mounting apron 14 to the desk 10. The hinge structure comprises a bracket 25 which is attached (Fig. 2) to the side support members for the top of the desk, in this case to the drawer wells 12. Bracket 25, as illustrated in Fig. 5, comprises a curved plate 26 which conforms to the shape of the lower edges of the drawer wells 12. Screw holes *27a* are provided through which the screws can be inserted for securing the bracket to the drawer wells 12. Protruding from plate 26 is a stem or post 28 which is adapted to fit into the circular recess 29 formed by the rolled tubular portion 30 of the apron 14. The brackets 25 are fastened on the bottom back corners of each of the drawer wells 12 so that they are adapted to support apron 14 at each of its lower corners. Accordingly, as shown in Figs. 4 and 5, apron 14 is adapted to pivot about its lower edge on posts 28 which are mounted on the inner, lower corners of the drawer wells 12. The brackets 25 and the recesses 29 collectively constitute the hinge structure.

In assembling the apron on a conventional desk having two drawer wells or other type of support on each side thereof, the posts 28 of brackets 25 are inserted in the circular recesses 29 of tubular portion 30. The brackets 25 are then attached to the bottom corners of drawer wells 12. In this position, apron 14 is pivotally mounted on brackets 25 and when swung downwardly, panel board 16 can be slidably inserted in the track formed by the recesses 35 in the edges 17. Accordingly, when installing electrical equipment, it is first mounted on panel board 16. The panel board 16 is then slid into the track recesses 35 provided by edges 17. When inserted into position, as shown by the dotted lines 15 of Fig. 2, apron 14 is lifted and swung upwardly into closed position such as shown in Fig. 1. It is then fastened in position by means of screws inserted through holes 27.

Frequently, one desk is substituted for another. In such cases, according to this invention, the apron is detached from the top 11 and swung out and downwardly about the hinge structure, previously described. The panel board 16 is removed and it is inserted in the apron of the new desk.

Office desks today, although made in different sizes, are usually modular or in standard increments. Accordingly, the aprons of the desks are standardized in size and differ in specific increments of widths. For example, they may be made in 4 inch modules in which case the widths may be 24 inches, 28 inches, 32 inches, etc. This invention adapts itself very well to such modules because the panel board 16 can be made to the smallest standard size and its length increased for larger sizes by adding one or more extension boards of modular sizes. In many cases, the apron of a replacement desk is the same size as the desk it replaces. In such cases, the same equipment panel board 16 can be utilized without varying its length. In those cases where the apron of the replacement desk is wider than the length of the equipment panel board, it can be lengthened by adding end extensions. An example of such extensions is shown in Fig. 6 wherein is shown the extension 30 added onto panel board 16. The connection between these two boards is preferably a tongue and groove connection 31 which prevents the board from being bent at the joint. Extensions 30 can be made of several modules so that boards 16 can be lengthened to correspond with standard sizes of aprons. As a result, the standard panel board 16 can be lengthened to any desired modular size by adding a selected extension board 30. For example, a standard 24 inch panel board can be lengthened by adding extension boards of 2, 4, 6, 8 and 10 inches so that the panel board is lengthened to the modular 26, 28, 30, 32 and 34 inch sizes respectively.

It should be understood that in describing this invention, it has only been described in relation to the modification shown on the appended drawings. Various modifications can be made without departing from the scope of this invention. For example, the edges 17 may be separate components attached to the basic apron panel. Any arrangement of channels or tracks for slidably and removably mounting panel board 16 can be used in this invention without departing from the principle thereof. Also, any hinge structure can be used in place of that disclosed herein.

My invention should be limited only to the extent as set forth in the appended claims.

I claim:

1. In combination with a desk having a top and spaced side support members for supporting the top, said spaced side suport members providing a passageway between them extending from the front of the desk to the back; an apron, having inside and outside faces, extending between said support members at the front of the desk and closing off at least a portion of said passageway; and means for mounting said apron for at least partial removal from its position between said support members whereby access to the inside face of said apron can be obtained, and means on the inside face of said apron for removably supporting an equipment panel.

2. In combination with a desk having a top and side support members for supporting the top: an apron extending between said support members and having inside and outside faces, and means for mounting said apron for at least partial removal from its position between said support members whereby access to the inside face of said apron can be obtained, a flanged track on the inside face of said apron in which an equipment panel is adapted to slide and be supported.

3. In combination with a desk having a top and support members for supporting the top: an apron normally closing at least a portion of the space between said support members and having inside and outside faces, and means for pivotally mounting said apron on said desk, said apron having on its inside face means for removably supporting an equipment panel.

4. In combination with a desk having a top mounted on a pair of spaced drawer wells: an apron normally extending between said drawer wells to close at least a portion of the space between said drawer wells and having inside and outside faces, and means for pivotally mounting said apron on said drawer wells near the bottom edge thereof, and a flanged track on the inside face of said apron in which an equipment panel is adapted to slide and be supported.

5. In combination with a desk having a top and spaced support members for supporting the top: an apron normally closing at least a portion of the space between said support members and having inside and outside faces, brackets mounting on each of said support members, means for pivotally mounting said apron near its lower corners on said brackets, said apron having on its inner face means for removably supporting an equipment panel.

6. A desk having two support members and an apron pivotally supported between said two support members, said apron comprising a single sheet of metal stock steel bent at its side edges to provide a track for a panel board; a rolled over portion at its bottom edge providing a cylindrical recess receiving posts secured to said support members for pivotally supporting said apron; and means at the upper edge of said apron for fixedly attaching said upper edge to said desk.

7. A desk having two side support members pivotally supporting an apron therebetween, said apron comprising one sheet of metal bent at its side edges to provide a track for a panel board and also reversibly bent back to provide a space for a gasket; a gasket mounted in said space; said apron at its lower edge being turned over to provide a cylindrical recess receiving support posts secured to said support members for pivotally supporting said apron; and means at the upper edge of said apron for fixedly attaching said upper edge to said desk.

References Cited in the file of this patent

UNITED STATES PATENTS

| | | |
|---|---|---|
| 498,178 | Leonard | May 23, 1893 |
| 903,328 | Shepard | Nov. 10, 1908 |
| 1,379,134 | Steddom | May 24, 1921 |
| 1,407,309 | Victorsohn | Feb. 21, 1922 |
| 2,133,127 | Waterman | Oct. 11, 1938 |
| 2,276,635 | Weber | Mar. 17, 1942 |
| 2,299,409 | Rathburn | Oct. 20, 1942 |
| 2,426,055 | Rundell | Aug. 19, 1947 |
| 2,472,579 | Freeman | June 7, 1949 |
| 2,633,398 | McAllister | Mar. 31, 1953 |
| 2,646,325 | Abrahamson | July 21, 1953 |
| 2,678,489 | Ratzlaff | May 18, 1954 |